US007536055B2

United States Patent
Ogawa

(10) Patent No.: US 7,536,055 B2
(45) Date of Patent: May 19, 2009

(54) IMAGE COMPRESSION DEVICE, IMAGE OUTPUT DEVICE, IMAGE DECOMPRESSION DEVICE, PRINTER, IMAGE PROCESSING DEVICE, COPIER, IMAGE COMPRESSION METHOD, IMAGE DECOMPRESSION METHOD, IMAGE PROCESSING PROGRAM, AND STORAGE MEDIUM STORING THE IMAGE PROCESSING PROGRAM

(75) Inventor: Kazuma Ogawa, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 734 days.

(21) Appl. No.: 11/131,265

(22) Filed: May 18, 2005

(65) Prior Publication Data

US 2005/0259876 A1    Nov. 24, 2005

(30) Foreign Application Priority Data

May 19, 2004   (JP)   ............................. 2004-149662

(51) Int. Cl.
*G06K 9/36*   (2006.01)
*G06K 9/46*   (2006.01)

(52) U.S. Cl. ...................................................... 382/232

(58) Field of Classification Search ................. 382/162, 382/164, 167, 173, 190, 218, 219, 232, 233, 382/236, 244, 246–247, 250, 260–264; 358/443, 358/501, 515, 518, 519
See application file for complete search history.

(56) References Cited

U.S. PATENT DOCUMENTS 4,903,317 A * 2/1990 Nishihara et al. ............ 382/244
5,341,318 A * 8/1994 Balkanski et al. ............ 708/402
5,539,842 A * 7/1996 Schwartz ..................... 382/232
5,598,483 A * 1/1997 Purcell et al. ................ 382/232
5,615,287 A * 3/1997 Fu et al. ...................... 382/232
5,966,466 A * 10/1999 Miura ......................... 382/236
6,141,446 A * 10/2000 Boliek et al. ................ 382/233

(Continued)

FOREIGN PATENT DOCUMENTS

JP    2000-341532 A    12/2000

(Continued)

OTHER PUBLICATIONS

"Compression of Image Data" Lecture Note 12; Image Information Processing.

(Continued)

*Primary Examiner*—Amir Alavi
(74) *Attorney, Agent, or Firm*—Birch, Stewart, Kolasch & Birch, LLP

(57) ABSTRACT

In a data compressing section, an image decompressing section decompresses compression RGB data, obtained by lossy compression, to generate decompression RGB data. A second segmentation section generates a decompression segmentation signal. Further, a differential extracting section generates a differential signal that indicates a differential between the segmentation signal and the decompression segmentation signal. A second signal compressing section generates a compression differential signal. Then, this compression differential signal is outputted as storage-use segmentation signal (signal indicating segmentation information), to a data storage section, together with the compression RGB data. The compression differential signal is smaller in size than the segmentation signal. This allows for reduction of a time required for data output and reduction of a required storage space.

18 Claims, 6 Drawing Sheets

U.S. PATENT DOCUMENTS

| | | | |
|---|---|---|---|
| 6,157,745 A * | 12/2000 | Salembier | 382/236 |
| 6,298,166 B1 * | 10/2001 | Ratnakar et al. | 382/248 |
| 6,400,844 B1 * | 6/2002 | Fan et al. | 382/173 |
| 6,941,019 B1 * | 9/2005 | Mitchell et al. | 382/232 |
| 2005/0259876 A1 * | 11/2005 | Ogawa | 382/232 |

FOREIGN PATENT DOCUMENTS

| | | |
|---|---|---|
| JP | 2003-162382 A | 6/2003 |
| JP | 2004-112604 A | 4/2004 |

OTHER PUBLICATIONS

"A Network-Based High Speed and High Picture Quality Video Surveillance System"; Sanyo Technical Review; vol. 35, No. 1, pp. 91-99, Jun. 2003.

* cited by examiner

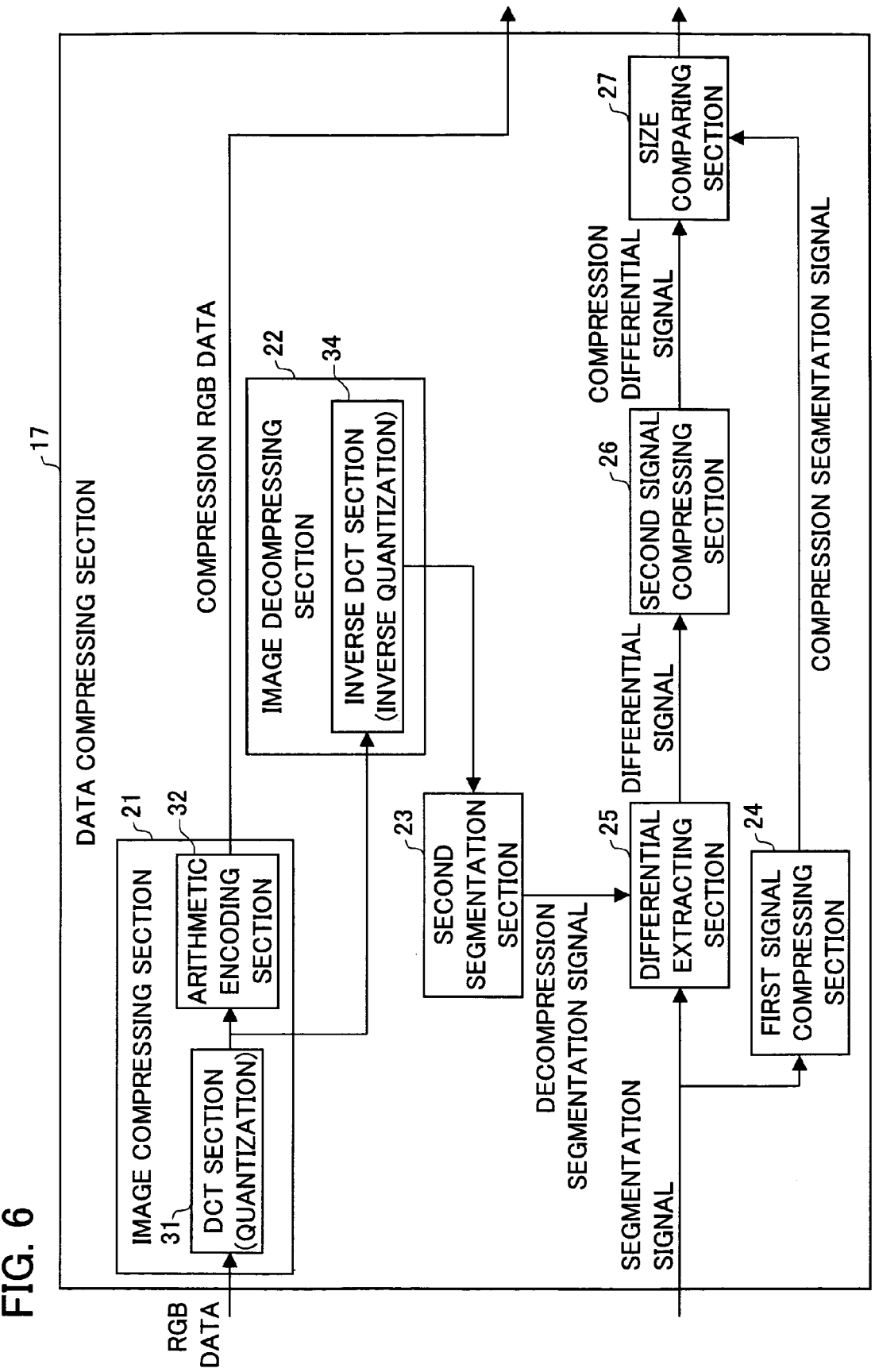

IMAGE COMPRESSION DEVICE, IMAGE OUTPUT DEVICE, IMAGE DECOMPRESSION DEVICE, PRINTER, IMAGE PROCESSING DEVICE, COPIER, IMAGE COMPRESSION METHOD, IMAGE DECOMPRESSION METHOD, IMAGE PROCESSING PROGRAM, AND STORAGE MEDIUM STORING THE IMAGE PROCESSING PROGRAM

This Nonprovisional application claims priority under 35 U.S.C. § 119(a) on Patent Application ). 2004/149662 filed in Japan on May 19, 2004, the entire contents of which are hereby incorporated by reference.

FIELD OF THE INVENTION

The present invention relates to an image compression device which performs lossy compression on original image data and a decompression device which decompress lossy-compressed image data.

BACKGROUND OF THE INVENTION

In a conventional printer, original image data (RGB data or the like) scanned by a scanner or externally inputted is stored into memory by using a technique of compressing original image data because this technique needs smaller amounts of memory space used. Compressed image data is printed (image-reproduced) in the following manner: the compressed image data is decompressed, the decompressed data is converted into CMYK data, and the CMYK data is outputted to the print engine.

Japanese Laid-Open Patent Application No. 2003/162382 (Tokukai 2003-162382; published on Jun. 6, 2003) uses a lossy compression technique that achieves a high data compression ratio. Incidentally, image data decompressed after it was lossy-compressed usually has distortion from original image data. Therefore, there is a low reliability or faithfulness in image reproduction. This is because image segmentation is performed on the basis of decompressed image data (CMYK data), which gives a low accuracy in judgment for image segmentation.

In view of this, Japanese Laid-Open Patent Application No. 2003/162382 performs, for realization of high-quality image processing, image segmentation on yet-to-be-lossy-compressed original image data, generates a segmentation signal (image segmentation data), and stores it into memory (image segmentation memory). Then, after lossy-compressed data is decompressed, correction is performed on decompressed image data (CMYK data) in accordance with the segmentation signal.

However, Japanese Laid-Open Patent Application No. 2003/162382 causes the problems of requiring increase of the image segmentation memory space when the size of the segmentation signal is large in size and of taking much time for data transmission.

SUMMARY OF THE INVENTION

An object of the present invention is to provide an image compression device capable of decreasing a size of a signal indicating a result of segmentation, generated together with lossy-compressed data (compression image data), and an image decompression device capable of restoring a complete segmentation signal with the use of the above signal.

In order to achieve the above object, an image compression device of the present invention is an image compression device which performs lossy compression on original image data, comprising: (i) a first segmentation section for performing segmentation on the original image data and then generating a segmentation signal indicating a result of the segmentation; (ii) an image compressing section for performing lossy compression on the original image data to generate compression image data; (iii) a first image decompressing section for decompressing the compression image data to generate decompression image data; (iv) a second segmentation section for performing segmentation on the decompression image data and then generating a decompression segmentation signal indicating a result of the segmentation; (v) a differential extracting section for extracting a differential between the segmentation signal and the decompression segmentation signal, and then generating a differential signal indicating a result of the extraction; and (vi) a differential signal compressing section for performing lossless compression on the differential signal to generate a compression differential signal.

The present compression device is designed so as to generate and output, in addition to the compression image data, segmentation information corresponding to a result of segmentation of the original image data. To obtain the segmentation information, the present compression device includes: the first segmentation section, the first image decompressing section, the second segmentation section, the differential extracting section, and the differential signal compressing section.

That is, in the present compression device, the first segmentation section performs segmentation on the original image data and then generates a segmentation signal indicating a result of the segmentation. Next, the first image decompressing section decompresses the compression image data obtained by lossy compression and then generates the decompression image data.

Then, on this decompression image data, the second segmentation section performs segmentation and then generates a decompression segmentation signal indicating a result of the segmentation. Further, the differential extracting section extracts a differential between the segmentation signal and the decompression segmentation signal and then generates a differential signal indicating a result of the extraction. Thereafter, the differential signal compressing section performs lossless-compression on the generated differential signal so as to output the compression differential signal as segmentation information to an external entity.

This compression differential signal is generated by lossless compression and is therefore possible to be completely decompressed in the form of the differential signal. The differential signal is calculated with a decompression segmentation signal that is a result of the segmentation to the decompression image data (image data obtained by decompression of the compression image data), thereby generating a usual segmentation signal (signal obtained by segmentation of the image data before it is compressed).

Here, the decompression image data usually has distortion from the original image data, but is an image data very similar to the original image data. Therefore, the decompression segmentation signal matches the usual segmentation signal in large portions although having a difference from the segmentation signal, when detected by text edge detection or the like, because of loss of high-frequency components.

Therefore, the differential signal is a signal including "0 (blank)" in large portions. Therefore, "0" portions can be easily removed from the differential signal to generate the compression differential signal obtained by lossless compression of the differential signal. This extremely increases a compression ratio (For example, it is possible to divide the differential signal into blocks each of which is given a number, and then omit all "0" blocks for compression.). Therefore, the present compression device makes it possible to extremely reduce size of the compression differential signal.

Thus, the present compression device outputs, as segmentation information, the compression differential signal with a small size as well as the compression image data to an external entity. Therefore, the present compression device can decrease the size of segmentation information to be outputted, as compared with an arrangement where a segmentation signal and a compressed segmentation signal as well as the compression image data are outputted. Accordingly, the present compression device can reduce a time taken for data output (transfer). Moreover, it is possible to reduce a, required storage space in storing the generated compression image data and others in the storage section.

For a fuller understanding of the nature and advantages of the invention, reference should be made to the ensuing detailed description taken in conjunction with the accompanying drawings.

BRIEF DESCRIPTION OF THE DRAWINGS

FIG. 6 is an explanatory diagram illustrating another configuration of an input processing section of the image processing section illustrated in FIG. 3.

DESCRIPTION OF THE EMBODIMENTS

Figure 2:
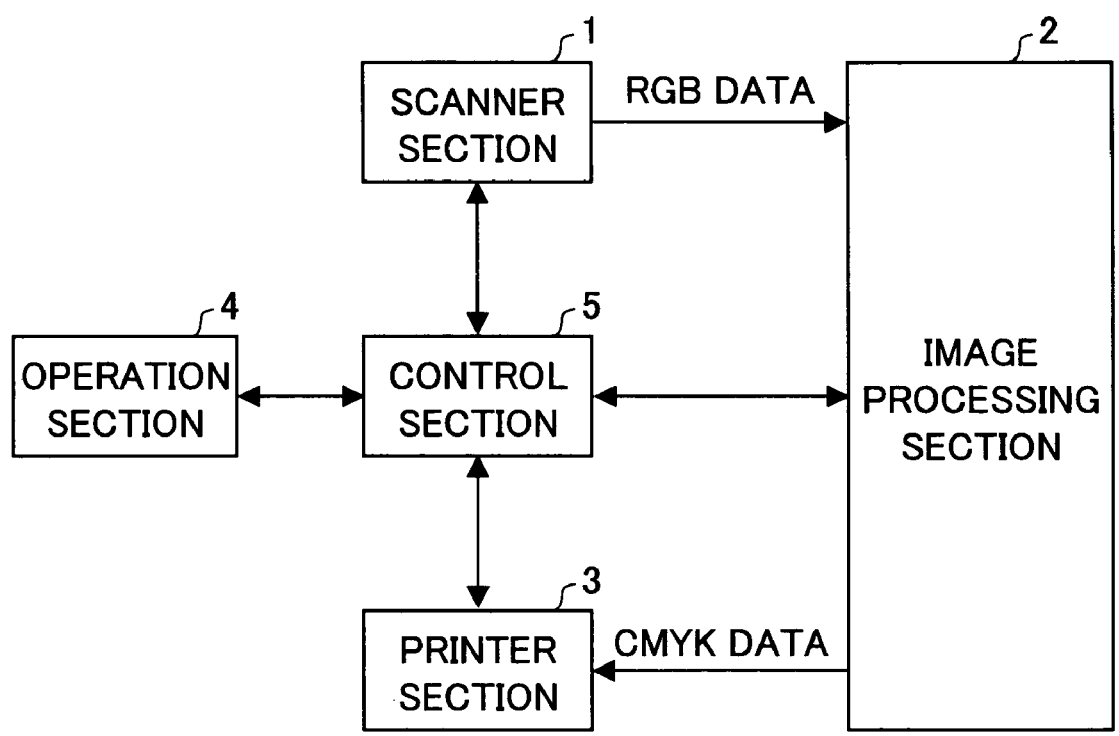
FIG. 2 is an explanatory diagram illustrating a configuration of the above-mentioned color digital copier.

The following will describe one embodiment of the present invention. FIG. 2 is an explanatory diagram illustrating a configuration of a color digital copier (present copier) according to the present embodiment. As illustrated in FIG. 2, the present copier includes a scanner section 1, an image processing section 2, and a printer 3.

The scanner section (image output device) 1 includes an optical scanning unit, a document setting stage, CCD (Charge Coupled Device), and others (none of the components are shown). The scanner section 1 reads an optical image reflected from a document through the CCD so as to output RGB (R: red, G: green, B: blue) image data (RGB data).

The image processing section (image processing device) 2 stores RGB data, outputted from the scanner section 1, under compression. Further, the image processing section 2 has a function of converting compressed RGB data (compression RGB data) into CMYK digital image data (CMYK data) suitable for printing, and then outputting the CMYK data to the printer section 3. The image processing section 2 will be described in detail later.

The printer section (printer) 3, which is an electrophotographic printer, includes four photoreceptors and a fixing device (both of which are not shown). The printer section 3 performs image printing in such a manner so as to form on the photoreceptors electrostatic latent images corresponding to the CMYK data, and then transfer and fix these electrostatic latent images on a sheet (recording paper).

The operation panel 4 includes a liquid-crystal display screen, a setting button, a numeric keypad, and others (none of which are shown). The operation panel 4 has a function of accepting an instruction from the user as well as a function of giving the progress and result of a print process to the user.

The control section 5 is a main part, of the present copier, which controls all operations of the present copier. In other words, the control section 5, in accordance with an instruction given through the operation panel 4 from the user, performs (i) a process of reading a document image by the scanner section 1, (ii) a process of generating the compression RGB data and generating and outputting CMYK data by the image processing section 2, and (iii) a printing process by the printer section 3.

Figure 3:
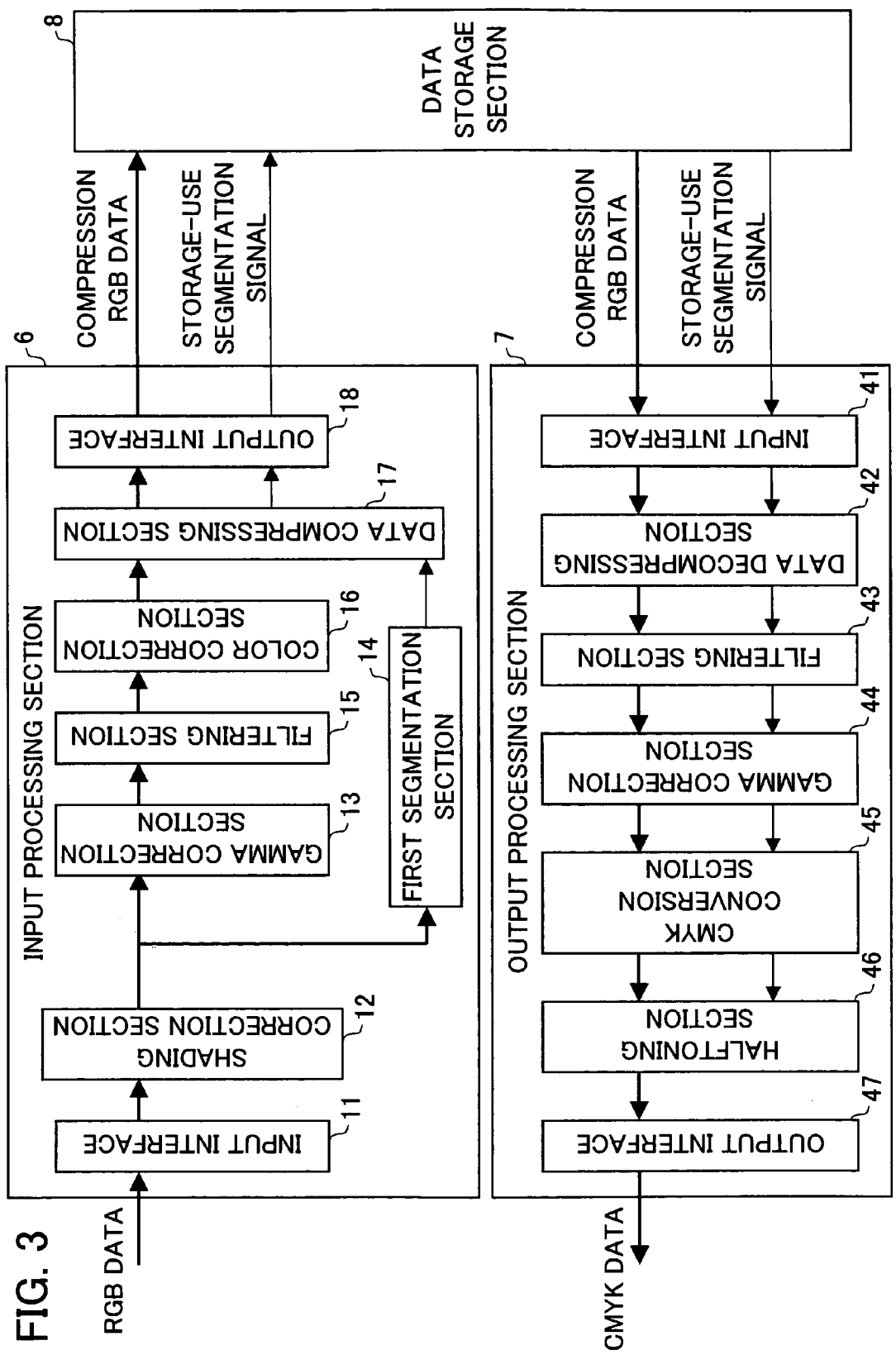
FIG. 3 is an explanatory diagram illustrating a configuration of an image processing section in the color digital copier illustrated in FIG. 2.

Next, the following will describe a specific configuration of the image processing section 2. FIG. 3 is an explanatory diagram illustrating a configuration of the image processing section 2. As illustrated in FIG. 3, the image processing section 2 includes an input processing section 6, an output processing section 7, and a data storage section 8.

The input processing section (image compression device) 6 converts RGB data outputted from the scanner section 1 into a compression RGB data so as to output the compression RGB data. Further, the input processing section 6 has a function of generating and outputting a segmentation signal indicating a result of the segmentation of the RGB data.

The data storage section (storage device) 8 is memory (data storage device) storing the compression RGB data outputted from the input processing section 6, and a storage-use segmentation signal. The output processing section (image decompression device) 7 reads out a compression RGB data and the storage-use segmentation signal from the data storage section 8, and then generates and outputs CMYK data in accordance with the read compression RGB data and the storage-use segmentation signal.

Next, the following will describe a specific configuration of the input processing section 6. As illustrated in FIG. 3, the input processing section 6 includes an input interface 11, a shading correction section 12, a gamma correction section 13, a first segmentation section 14, a filtering section 15, a color correction section 16, a data compressing section (image and segmentation signal compressing section) 17, and an output interface 18.

The input interface 11 is an input section for inputting RGB data outputted from the scanner section 1. The shading correction section 12 performs a process (shading correction) of removing from the RGB data a variety of distortions produced by a lighting system, an image-forming system, and an image-capturing system of the scanner section 1. The gamma correction section 13 performs γ correction to RGB data processed by the shading correction section 12.

The first segmentation section (first segmentation section) 14 judges, in accordance with RGB data processed by the shading correction section 12, "which type of image area each area of an image corresponding to the RGB data is classified into", and outputs a segmentation signal (4 bits) according to a result of the judgment. Note that, types of the image area classified by the first segmentation section 14 are black text edge image, colored text edge image, continuous tone image, screened halftone image, background image, solid image, and others.

The filtering section 15 performs filtering on the gamma-corrected RGB data through a color filter. The color correction section 16 performs color correction on the filtered RGB data by interpolation calculation.

The data compressing section 17 performs, on the color-corrected RGB data, lossy compression by JPEG (Joint Photographic Experts Group) compression, so as to generate compression RGB data. The data compressing section 17 has a function of generating the storage-use segmentation signal (described later) in accordance with the RGB data subjected to filtering and the segmentation signal outputted from the first segmentation section 14.

The output interface 18 is an output section that sends, to the data storage section 8, the compression RGB data and the storage-use segmentation signal generated by the data compressing section 17.

Figure 1:
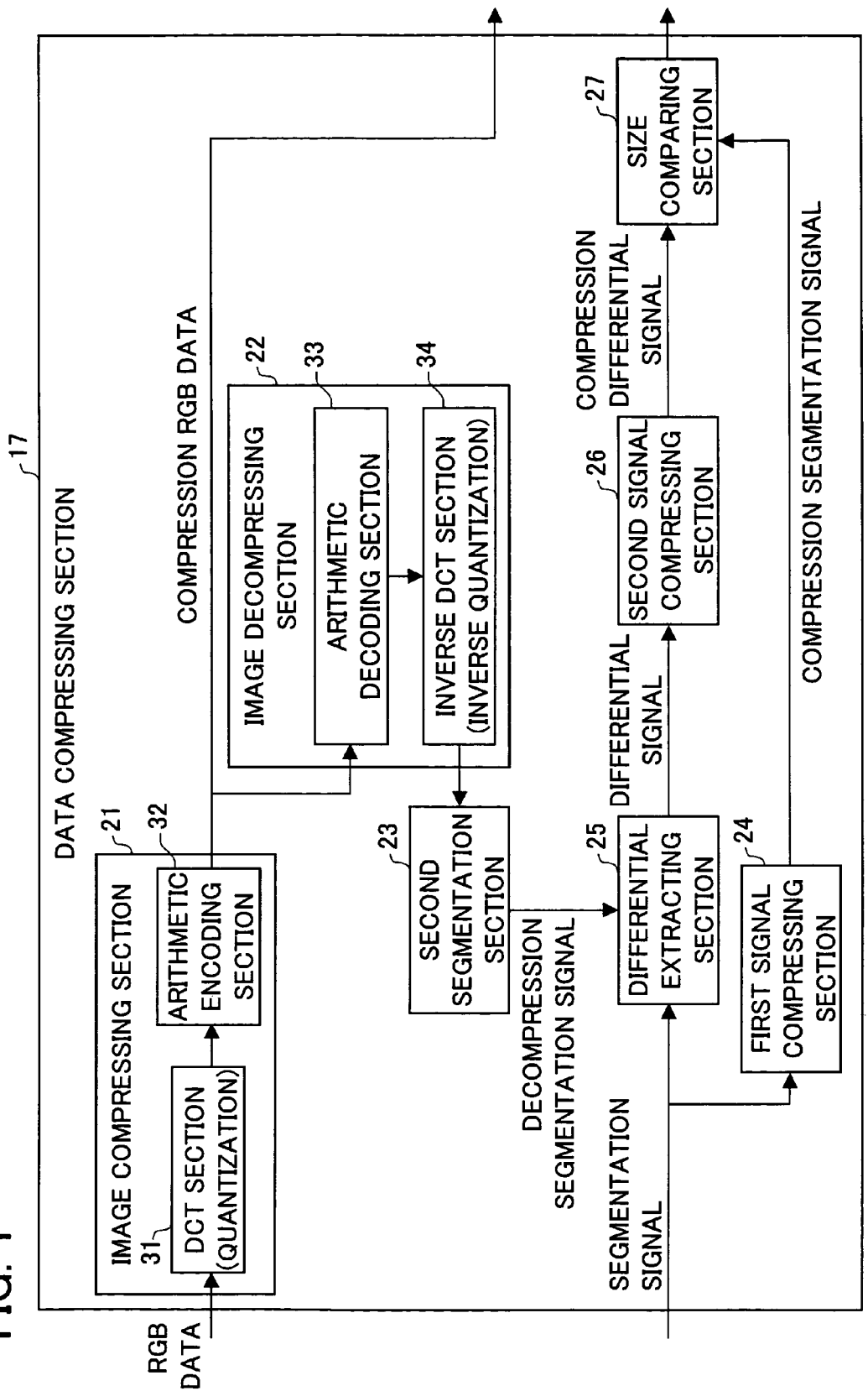
FIG. 1 is an explanatory diagram illustrating a data compressing section of an input processing section in an image processing section of a copier according to one embodiment of the present invention.

Here, the following will describe a specific configuration of the data compressing section 17. FIG. 1 is an explanatory diagram illustrating a configuration of the data compressing section 17. As illustrated in FIG. 1, the data compressing section 17 includes an image compressing section 21, an image decompressing section 22, a second segmentation section 23, a first signal compressing section 24, a differential extracting section (segmentation differential extracting section) 25, a second signal compressing section 26, and a size comparing section (data size comparing section) 27.

In the image compressing section 21, the RGB data outputted from the color correction section 16 is subjected to DCT-transformation and quantization by a DCT section 31 and then is subjected to arithmetic encoding (entropy encoding) by an arithmetic encoding section 32. In this manner, the image compressing section 21 is designed so as to lossy-compress (JPEG-compress) the RGB data for generation of the compression RGB data. Note that the image compressing section 21 outputs the generated compression RGB data to the data storage section 8 and the image decompressing section 22.

In the image decompressing section (first image decompressing section) 22, the compression RGB data is subjected to arithmetic decoding (entropy decoding) by an arithmetic decoding section 33 and then subjected to inverse DCT transformation and inverse quantization by an inverse DCT section 34. In this manner, the image decompressing section 22 temporarily decompresses the compression RGB data for generation of decompression RGB data (RGB data decompressed after it was lossy-compressed).

The second segmentation section (second segmentation section) 23 performs, on the decompression RGB data generated by the image decompressing section 22, segmentation that is the same process as that performed by the first segmentation section 14. The second segmentation section 23 is designed so as to generate and output a decompression segmentation signal indicating a result of the segmentation.

The differential extracting section 25 compares this decompression segmentation signal with the segmentation signal outputted from the first segmentation section 14 (see FIG. 3) so as to extract a differential between these signals. Then, the differential extracting section 25 outputs a differential signal indicating a result of the extraction.

Here, the following will describe examples of the segmentation signal, the decompression segmentation signal, and the differential signal. FIG. 4(a) is an explanatory diagram illustrating an image corresponding to the RGB data outputted from the color correction section 16 to the data compressing section 17. FIG. 4(b) is an explanatory diagram illustrating an image corresponding to the decompression RGB data obtained in such a manner that the RGB data is lossy-compressed by the image compressing section 21, and then the lossy-compressed RGB data is decompressed by the image decompressing section 22. As is seen from FIGS. 4(a) and 4(b), the image corresponding to the decompression RGB data illustrated in FIG. 4(b) has an edge-distorted character "A" with more loss of image quality, as compared with the image corresponding to the RGB data illustrated in FIG. 4(a).

FIG. 4(c) is an explanatory diagram illustrating an image corresponding to the segmentation signal obtained in such a manner that the RGB data outputted from the color correction section 16 is segmented. FIG. 4(d) is an explanatory diagram illustrating an image corresponding to a decompression segmentation signal obtained in such a manner that the decompression RGB data is segmented. As illustrated in FIG. 4(d), the image corresponding to the decompression segmentation signal has an edge-distorted character "A", like the character "A" in the image corresponding to the decompression RGB data of FIG. 4(b).

FIG. 4(e) is an explanatory diagram illustrating an image corresponding to the differential signal that indicates a differential between the segmentation signal and the decompression segmentation signal. As illustrated in FIG. 4(e), the differential signal varies depending upon a distortion in the decompression segmentation signal. In addition, the differential signal has the amount of data far smaller than those of the segmentation signal and the decompression segmentation signal.

Further, the second signal compressing section (differential signal compressing section) 26, as illustrated in FIG. 1, performs lossless compression on the differential signal outputted from the differential extracting section 25 so as to output a compression differential signal. The first signal compressing section (segmentation signal compressing section) 24 performs lossless compression on a segmentation signal outputted from the first segmentation section 14 so as to output a compression segmentation signal.

The size comparing section 27 compares in size between the compression differential signal outputted from the second signal compressing section 26 and the compression segmentation signal outputted from the first signal compressing section 24. The size comparing section 27 is designed so as to output a signal of a smaller size, as the storage-use segmentation signal, to the data storage section 8 via the output interface 18 (see FIG. 3).

Next, the following will describe a specific configuration of the output processing section 7 illustrated in FIG. 3. As illustrated in FIG. 3, the output processing section 7 includes an input interface 41, data decompressing section (image and segmentation signal decompressing section) 42, the filtering section 43, a gamma correction section 44, a CMYK conversion section (RGB-to-CMYK converting section) 45, a halftoning section 46, and an output interface 47.

The input interface 41 is an input section for inputting the compression RGB data and the storage-use segmentation signal both of which are outputted from the data storage section 8. The data decompressing section 42 decompresses the compression RGB data and the storage-use segmentation signal so as to generate and output decompression RGB data and a segmentation signal. Note that, the data decompressing section 42 will be described in detail later.

The filtering section 43 performs filtering on the decompression RGB data and the segmentation signal through a color filter. The gamma correction section 44 performs γ-correction on the filtered decompression RGB data and segmentation signal.

The CMYK conversion section 45 converts the gamma-corrected decompression RGB data and segmentation signal into data regarding CMYK, so as to generate CMYK data and CMYK segmentation signal.

The halftoning section 46 performs halftoning, such as dithering and error diffusion, on the CMYK data and CMYK segmentation signal so as to generate a proper CMYK data. The output interface 47 outputs the CMYK data supplied from the halftoning section 46, to the printer section 3 illustrated in FIG. 2.

Figure 5:
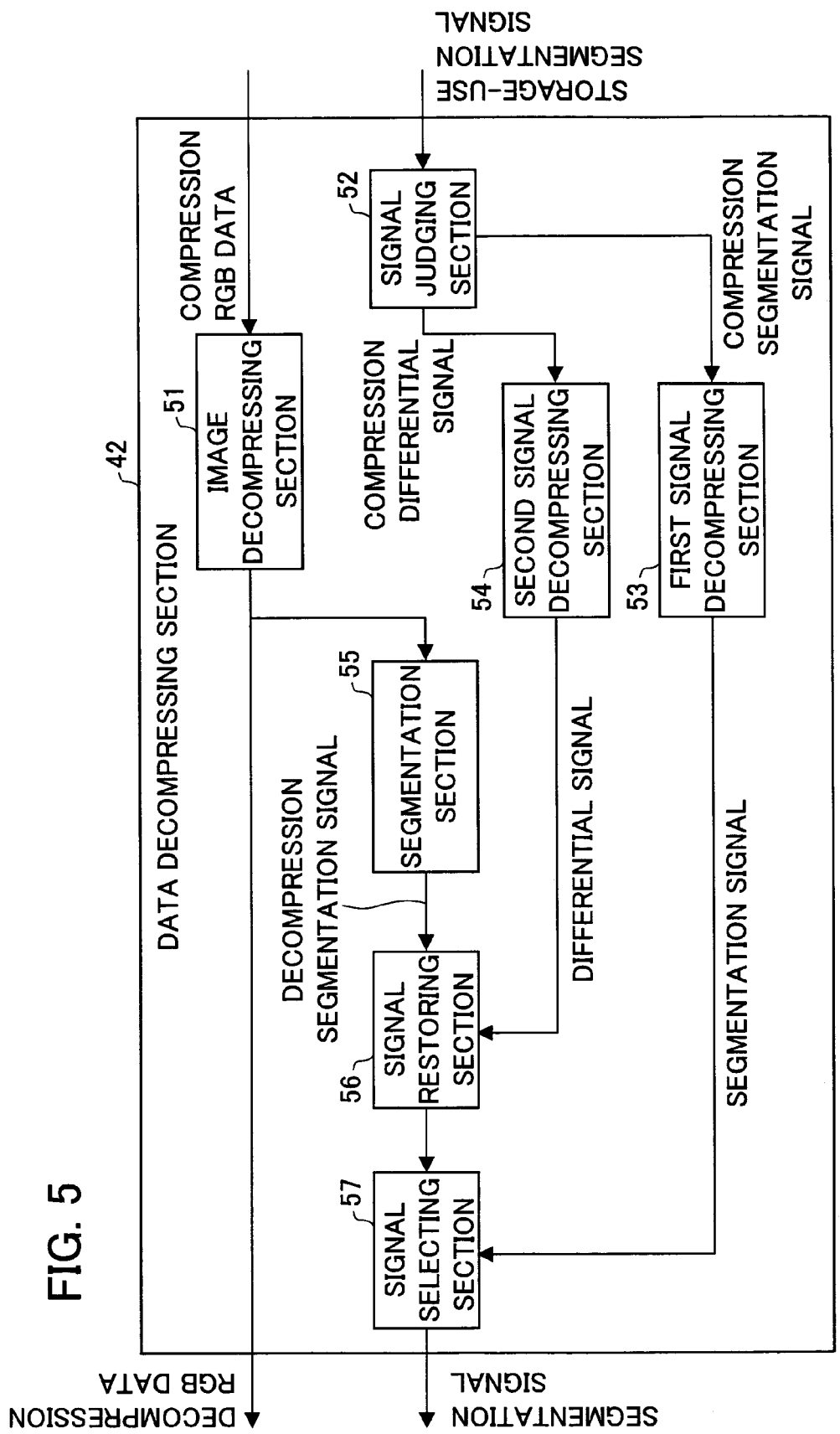
FIG. 5 is an explanatory diagram illustrating a configuration of a data decompressing section in an output processing section of the image processing section illustrated in FIG. 3.

Next, the following will describe a specific configuration of the data decompressing section 42. FIG. 5 is an explanatory diagram illustrating a configuration of the data decompressing section 42. As illustrated in FIG. 5, the data decompressing section 42 is composed of an image decompressing section 51, a signal judging section 52, a first signal decompressing section 53, a second signal decompressing section 54, a segmentation section 55, a signal restoring section 56, and a signal selecting section 57.

The image decompressing section (second image decompressing section) 51 includes an inverse DCT section and an arithmetic decoding section, which are the same as those in the image decompressing section 22. The image decompressing section 51 decompress the compression RGB data to generate decompression RGB data. Further, the image decompressing section 51 is designed so as to output the generated decompression RGB data to the filtering section 43 (see FIG. 3) and the segmentation section 55. The segmentation section (third segmentation section) 55 performs segmentation on the decompression RGB data and then generates a decompression segmentation signal indicating a result of the segmentation.

The signal judging section 52 judges the type of the storage-use segmentation signal outputted from the data storage section 8 (whether it is a compression segmentation signal or a compression differential signal). The signal judging section 52, if having judged that the storage-use segmentation signal is the compression segmentation signal, outputs this signal to the first signal decompressing section 53. On the other hand, if having judged that the storage-use segmentation signal is the compression differential signal, the signal judging section 52 is designed so as to output this signal to the second signal decompressing section 54.

The first signal decompressing section (segmentation signal decompressing section) 53 decompresses the compression segmentation signal so as to generate (restore) the segmentation signal. The second signal decompressing section (differential signal decompressing section) 54 decompresses the compression differential signal so as to generate (restore) the differential signal.

The signal restoring section 56 inputs (i) this differential signal and (ii) the decompression segmentation signal generated by the segmentation section 55, so as to generate (restore) the segmentation signal in accordance with these signals.

The signal selecting section 57 outputs, to the filtering section 43 (see FIG. 3), the segmentation signal generated by the signal restoring section 56 or the first signal decompressing section 53. Note that the signal selecting section 57 is designed so as to receive, from the signal judging section 52, information on whether a signal to be outputted is a signal generated by the signal restoring section 56 or a signal generated by the first signal decompressing section 53 (result of the judgment made by the signal judging section 52).

Next, the following will describe a copy operation of the present copier. In the present copier, the control section 5 starts a copy operation (see FIG. 2) when the user sets a document image on the scanner section 1 and pushes a start button (not shown) on the operation panel 4. That is, the control section 5 controls the scanner section 1 to scan the document image and generate RGB data corresponding to the scanned image.

Thereafter, the control section 5 controls the input processing section 6 of the image processing section 2 to generate the compression RGB data and the storage-use segmentation signal and store them in the data storage section 8 (see FIG. 3). In this procedure, the control section 5 causes the RGB data to be subjected to processes of the shading correction section 12, the gamma correction section 13, the first segmentation section 14, the filtering section 15, and the color correction section 16, all of which are provided in the input processing section 6. Then, the control section 5 causes the RGB data and segmentation signal to be outputted to the data compressing section 17.

Then, the control section 5 controls the components 21 through 26 of the data compressing section 17 so as to generate the compression RGB data, the compression differential signal, and the compression segmentation signal (see FIG. 1). The control section 5 controls the size comparing section 27 of the data compressing section 17 so as to set, as a storage-use segmentation signal, either the compression differential signal or the compression segmentation signal, whichever is of a smaller size.

After causing the data storage section 8 to store the compression RGB data and the storage-use segmentation signal, the control section 5 controls the output processing section 7 to read the compression RGB data and the storage-use segmentation signal from the data storage section 8 (see FIG. 3). Then, the control section 5 causes the printer section 3 to output CMYK data based on the compression RGB data and the storage-use segmentation signal (see FIG. 2).

In this procedure, the control section 5 controls the image decompressing section 51 (see FIG. 5) in the data decompressing section 42 of the output processing section 7 to generate decompression RGB data from the compression RGB data and then output the generated decompression RGB data to the filtering section 43 (see FIG. 3). Further, the control section 5 controls the signal judging section 52 of the data decompressing section 42 so as to judge "whether the storage-use segmentation signal read from the data storage section 8 is the compression differential signal or the compression segmentation signal" (see FIG. 5).

If the storage-use segmentation signal is the compression segmentation signal, the control section 5 controls the first signal decompressing section 53 to generate a segmentation signal and output the generated segmentation signal to the filtering section 43 through the signal selecting section 57. On the other hand, if the storage-use segmentation signal is the compression differential signal, the control section 5 causes the second signal decompressing section 54, the segmentation section 55, and the signal restoring section 56 to generate a segmentation signal and then output the generated segmentation signal to the filtering section 43 through the signal selecting section 57.

Thereafter, the control section 5 causes the decompression RGB data and segmentation signal to be subjected to processes of the filtering section 43, the gamma correction section 44, the CMYK conversion section 45, and the halftoning section 46, all of which are provided in the output processing section 7, so as to generate CMYK data (see FIG. 3). Then, the control section 5 causes the generated CMYK data to be outputted to the printer section 3 through the output interface 47 (see FIG. 2). In the end, the control section 5 controls the printer section 3 to print an image corresponding to the CMYK data on a sheet (printing paper). This ends the procedure.

As described above, the input processing section 6 of the image processing section 2 in the present copier is designed so as to generate and output, in addition to the compression RGB data, the compression differential signal varying depending upon a result of segmentation of the RGB data. In order to obtain the compression differential signal, the input processing section 6 includes, in addition to the first segmentation section 14, the image decompressing section 22, the second segmentation section 23, the differential extracting section 25, and the second signal compressing section 26, all of which are provided in the data compressing section 17.

That is, in the input processing section 6, the first segmentation section 14 performs segmentation on the RGB data and then generates a segmentation signal indicating a result of the segmentation. Subsequently, the image decompressing section 22 of the data compressing section 17 decompresses the compression RGB data obtained by lossy compression so as to generate the decompression RGB data.

Then, on this decompression RGB data, the second segmentation section 23 performs segmentation and then generates a decompression segmentation signal indicating a result of the segmentation. Further, the differential extracting section 25 extracts a differential between the segmentation signal and the decompression segmentation signal and then generates a differential signal indicating a result of the extraction. Thereafter, the second signal compressing section 26 compresses (lossless-compresses) the generated differential signal so as to generate a compression differential signal. Then, the generated compression differential signal is set to be outputted, as the storage-use segmentation signal (signal indicating segmentation information), to the data storage section 8.

This compression differential signal is generated by lossless compression and is therefore possible to be completely decompressed into the differential signal. The differential signal is calculated with a decompression segmentation signal that is a result of the segmentation to the decompression RGB data (RGB data obtained by decompression of the compression RGB data), thereby generating a usual segmentation signal (signal obtained by segmentation of the RGB data before it is compressed).

Here, the decompression RGB data usually has distortion from the RGB data, but is an image data very similar to the RGB data. Therefore, the decompression segmentation signal matches the usual segmentation signal in large portions although having a difference from the segmentation signal, when detected by text edge detection or the like, because of loss of high-frequency components.

Therefore, as illustrated in FIG. 4(e), the differential signal is a signal including "0 (blank)" in large portions. Therefore, "0" portions can be easily removed from the differential signal to generate the compression differential signal obtained by lossless compression of the differential signal. This extremely increases a compression ratio (For example, it is possible to divide the differential signal into blocks each of which is given a number, and then omit all "0" blocks for compression.). Therefore, the input processing section 6 makes it possible to extremely reduce size of the compression differential signal.

Thus, the present compression device outputs, as segmentation information, the compression differential signal with a small size as well as the compression RGB data to an external entity. Therefore, the input processing section 6 can decrease the size of a storage-use segmentation signal to be outputted, as compared with an arrangement where a segmentation signal and a compressed segmentation signal as well as the compression RGB data are outputted. Accordingly, the input processing section 6 can reduce a time taken for data output (transfer through a data bus) to the data storage section 8. Moreover, it is possible to reduce a storage space required in the data storage section 8.

Note that, as described above, the compression differential signal is usually a signal smaller in size than the segmentation signal and the compressed segmentation signal. However, it can be considered that depending upon a state of RGB data and a compression and decompression scheme, the compression differential signal becomes larger in size than the compressed segmentation signal.

Therefore, in order to address such a problem, the data compressing section 17 of the input processing section 6 includes, in addition to the second signal compressing section 26, the first signal compressing section 24 and the size comparing section 27. Here, the first signal compressing section 24 performs lossless compression on a segmentation signal so as to generate a compression segmentation signal (compressed segmentation signal).

Further, the size comparing section 27 selects, as the storage-use segmentation signal, either the compression segmentation signal or the compression differential signal, whichever is of a smaller size.

This allows the input processing section 6 to output the segmentation signal as the storage-use segmentation signal when the compression differential signal becomes larger in size than the compression segmentation signal.

Further, the output processing section 7 in the image processing section 2 of the present copier is arranged so as to include, in addition to the image decompressing section 51, the segmentation section 55, and the signal restoring section 56, the signal judging section 52, the second signal decompressing section 54, and the first signal decompressing section 53, in order to generate the decompression RGB data and the segmentation signal in accordance with the compression RGB data and the storage-use segmentation signal inputted from the data storage section 8.

That is, in the data decompressing section 42 of the output processing section 7, the image decompressing section 51 decompresses the compression RGB data to generate the decompression RGB data. On this decompression RGB data, the segmentation section 55 performs segmentation and then generates a decompression segmentation signal indicating a result of the segmentation.

Further, the signal judging section 52 judges whether the inputted storage-use segmentation signal is a compression segmentation signal or a compression differential signal. If this signal is the compression differential signal, the second signal decompressing section 54 decompresses the compression differential signal to generate a differential signal. Thereafter, the signal restoring section 56 generates a segmentation signal in accordance with the decompression segmentation signal and the differential signal. On the other hand, if the storage-use segmentation signal is the compression segmentation signal, the first signal decompressing section 53 decompresses this compression segmentation signal so as to generate the segmentation signal.

Thus, the output processing section 7 is arranged so as to easily generate, from the compression RGB data and the storage-use segmentation signal (compression segmentation signal or compression differential signal), a complete segmentation signal corresponding to the RGB data.

Note that, in the present embodiment, as illustrated in FIG. 1, the image compressing section 21 of the data compressing section 17 in the input processing section 6 includes the DCT section 31 and the arithmetic encoding section 32. That is, the image compressing section 21 performs DCT transformation and quantization on the RGB data, and then performs arithmetic encoding. Further, the image decompressing section 22 of the data compressing section 17 performs arithmetic decoding on the compression RGB data, and then performs inverse DCT transformation and inverse quantization so as to generate decompression RGB data.

Here, such an image decompression process (arithmetic decoding, inverse DCT transformation, and inverse quantization) performed by the image decompressing section 22 is a process to cause the second segmentation section 23 to generate the decompression segmentation signal. That is, this process is performed so that the second segmentation section 23 performs segmentation on the decompression RGB data (image-degraded RGB data obtained in such a manner that RGB data is decompressed after it was lossy-compressed) obtained by the image decompression section 22 so as to generate the decompression segmentation signal.

Therefore, it can be said that the compression RGB data outputted to the image decompressing section 22 does not necessarily require to be subjected to arithmetic encoding (lossless compression) as far as the compression RGB data is subjected to DCT transformation (conversion into sets of frequencies; lossy compression). Therefore, the data compressing section 17 may be arranged in such a manner illustrated in FIG. 6.

The data compressing section 17 illustrated in FIG. 6 is different from that illustrated in FIG. 1 in that the image decompressing section 22 is provided with only the inverse DCT section 34, excluding the arithmetic decoding section 33. Further, this data compressing section 17 is designed so that RGB data subjected to DCT transformation and quantization, obtained by the DCT section 31 of the image compressing section 21, is supplied to the inverse DCT section 34 of the image decompressing section 22.

Even in such an arrangement, the second segmentation section 23 can obtain the decompression segmentation signal the same as that in the arrangement of FIG. 1. In addition, this arrangement eliminates the need for provision of the arithmetic encoding section 32 in the image decompressing section 22, thus allowing for reduction in manufacture cost. Moreover, this arrangement omits the arithmetic encoding performed by the image decompressing section 22, thus allowing for reduction of a processing time.

Further, in the present embodiment, the DCT section 31 performs DCT transformation and quantization on the RGB data, and the inverse DCT section 34 performs inverse DCT transformation and inverse quntization on the compression RGB data subjected to arithmetic decoding. However, the DCT section 31 may be arranged so as to perform only DCT transformation on the RGB data (not perform quantization) on the RGB data. In this case, the inverse DCT section 34 is also arranged so as to perform only inverse DCT transformation on the compression RGB data (not perform the inverse quantization).

Further, in the present embodiment, in order to generate the compression RGB data, the DCT section 31 and the arithmetic encoding section 32 in the image compressing section 21 respectively perform DCT transformation and arithmetic encoding on the RGB data.

However, this is not the only possibility. For generation of the compression RGB data, a conversion technique other than DCT transformation (e.g. technique for conversion into sets of frequencies; wavelet compression (DWT) or other method) may be adopted. Further, entropy encoding other than arithmetic encoding (Huffman coding, EBCOT, or other method) may be adopted (see http://cis.k.hosei.ac.jp/~hana/pdfs/iip/image_compress. pdf (Image Information Processing (Lecture Note 12. Compression of Image Data)), http://www.sanyo.co.jp/giho/no72/pdf/7211.pdf (A Network-based High Speed and High Picture Quality Video Surveillance System). Note that, in JPEG2000, wavelet compression (DWT) is adopted instead of the DCT transformation, and EBCOT is adopted as entropy encoding (see: http://www.sanyo.co.jp/giho/no72/pdf/7211.pdf).

Further, the input processing section 6 illustrated in FIG. 1 and the output processing section 7 illustrated in FIG. 5 may be integrated into one unit. Still further, the data compressing section 17 of the input processing section 6 and the data decompressing section 42 of the output processing section 7 are preferably integrated into one unit.

In such an arrangement, instead of (i) the image decompressing section 22 of the data compressing section 17 and (ii) the image decompressing section 51 of the data decompressing section 42, one image decompressing section may be used. Also, instead of (I) the second segmentation section 23 of the input processing section 6 and (II) the segmentation section 55 of the output processing section 7, one segmentation section is preferably used. This arrangement decreases one image decompressing section and one segmentation section, thus realizing size reduction in a circuit into which the input processing section 6 and the output processing section 7 are integrated.

In the present embodiment, the differential extracting section 25 compares between (a) the decompression segmentation signal and (b) the segmentation signal outputted from the first segmentation section 14, so as to extract a differential therebetween. The signal restoring section 56 inputs this differential signal and the decompression segmentation signal generated by the segmentation section 55, so as to generate (restore) the segmentation signal in accordance with these signals.

Here, when the differential signal is generated from the equation "decompression segmentation signal−segmentation signal", the signal restoring section 56 generates the segmentation signal by calculating the equation "decompression segmentation signal−differential signal". On the other hand, when the differential signal is generated from the equation "segmentation signal−decompression segmentation signal", the signal restoring section 56 generates the segmentation signal by calculating the equation "decompression segmentation signal+differential signal".

Further, in the present embodiment, the image processing section 2 converts the decompression RGB data into CMYK data and then outputs the CMYK data to the printer section 3. However, this is not the only possibility. If one used as the printer section 3 processes RGB data, the image processing section 2 directly outputs the decompression RGB data to the printer section 3 without converting the decompression RGB data into the CMYK data.

Still further, in the present embodiment, the input processing section 6 outputs, to the data storage section 8, either the compression segmentation signal or the compression differential signal, whichever is of a smaller size, as the storage-use segmentation signal. The data decompressing section 42 of the output processing section 7 judges whether the storage-use segmentation signal supplied from the data storage section 8 is the compression segmentation signal or the compression segmentation signal, and then generates the segmentation signal in a method varying depending upon a result of the judgment.

However, this is not the only possibility. The input processing section 6 may be set so as to regard the differential signal as the storage-use segmentation signal all the time, without generating the compression segmentation signal. In this case, the output processing section 7 always generates the segmentation signal in accordance with the compression differential signal. In such an arrangement, the size comparing section 27, the signal judging section 52, and the first signal decompressing section 53 can become unnecessary, so that it is possible to reduce cost by the input processing section 6 and the output processing section 7.

Yet further, in the present embodiment, the present copier has the scanner section 1, the image processing section 2, the printer section 3, the operation panel 4, and the control section 5. However, the image processing section 2 may be arranged to be incorporated into the scanner section 1 or the printer section 3. The image processing section 2 in whole may be incorporated into the scanner section 1 or the printer section 3. Alternatively, the image processing section 2 in part may be incorporated into each of the scanner section 1 and the printer section 3.

For example, the input processing section 6 and the output processing section 7 in the image processing section 2 may be incorporated into the scanner section 1 and the printer section 3, respectively. In this arrangement, the data storage section 8 of the image processing section 2 may be incorporated into either the scanner section 1 or the printer section 3.

Further, in the present embodiment, the data compressing section 17 in the input processing section 6 of the image processing section 2 performs lossy compression by JPEG compression on color-corrected RGB data so as to generate compression RGB data. However, a lossy compression method performed by the data compressing section 17, not limited to JPEG compression, may be any other method.

Still further, in the present embodiment, types of the image area classified by the first segmentation section 14 are black text edge image, colored text edge image, continuous tone image, screened halftone image, background image, solid image, and others. However, the types of the image area classified by the first segmentation section 14, not limited to the above images, may be any types of images (For example, they may be three types of text, continuous tone, and screened halftone).

Yet further, in the present embodiment, the color correction section 16 in the input processing section 6 of the image processing section 2 performs color correction by interpolation calculation on the filtered RGB data. However, a color correction method performed by the color correction section 16, not limited to interpolation calculation, may be any other method.

Further, in the present embodiment, the image processing section 2 of the present copier includes both the input processing section 6 and the output processing section 7. However, another embodiment of the present invention can arrange a scanner including only the input processing section 6. Such a scanner is one realized by a general scanner, like the scanner section 1 illustrated in FIG. 2, including the input processing section 6 illustrated in FIG. 1. In addition, the scanner outputs, to an external device (e.g. storage device or printer), the compression RGB data and the storage-use segmentation signal.

Still further, another embodiment of the present invention can arrange an input image processing device which is realized by only the input processing section 6 (or the data compressing section 17). Such a device generates and outputs, in accordance with externally inputted RGB data, the compression RGB data and the storage-use segmentation signal.

Examples of such RGB data include image information (electronic image) outputted from an electronic video device (image output device) such as facsimile machine, computer, digital camera, or video player. Alternatively, the input processing section 6 (or the data compressing section 17) may be incorporated into the above-mentioned electronic video device.

The above-mentioned scanner, input image processing device, and electronic video device can produce less amount of output data than was previously possible, thus decreasing time and memory size required for processing of these pieces of data. This makes it possible to realize a high-quality printing at low cost, with the use of a printer which can process the compression RGB data and the storage-use segmentation signal.

Yet further, another embodiment of the present invention can arrange a printer including the output processing section 7. Such a printer is one realized by a general printer, like the printer section 3 illustrated in FIG. 2, including the output processing section 7. In addition, the printer prints out an image in accordance with the compression RGB data and the storage-use segmentation signal inputted from an external device (e.g. storage device or scanner).

Such a printer can realize a high-quality printing at low cost, with the use of a device capable of generating and outputting the compression RGB data and the storage-use segmentation signal.

Yet further, another embodiment of the present invention can arrange an output image processing device which is realized by only the output processing section 7. Such a device generates and outputs the RGB data or the CMYK data in accordance with externally inputted compression RGB data and storage-use segmentation signal.

Further, it is possible to transmit the compression RGB data and the storage-use segmentation signal generated by the aforementioned device (scanner, input image processing device) including the input processing section 6 via a storage medium or a communications medium (Internet) to the device (printer, output image processing device) including the output processing section 7.

Still further, the output processing section 7 (or the data decompressing section 42) may be included in an image display device, such as a liquid crystal display or CRT. This arrangement allows for a high-quality image display based on the compression RGB data and the storage-use segmentation signal outputted from the image output device including the input processing section 6 (data compressing section 17).

Yet further, in the above description, all the processes in the present copier are performed under control of the control section 5. However, this is not the only possibility. Alternatively, the control section 5 may be replaced with an information processing device (computer) which can read out a program for performing these processes, the program being stored in a storage medium.

That is, all the processes in the present copier (especially, image compression and decompression) are realized by the aforementioned ASIC-based image processing section 2 (image compression and decompression device) and the control section 5. Alternatively, all the processes in the present copier is realized in such a manner that a program for performing these processes (for example, image compression and decompression program) is incorporated into a computing device such as DSP (Digital Signal Processor) so that this computing device executes the processes (the processes are executed by software).

In this arrangement, a computing device (CPU, MPU, DSP) of the information processing device executes the program stored in the storage medium. Therefore, it can be said that this program itself realizes the processes.

Here, as the foregoing information processing device can be used, apart from a general computer (workstation or personal computer), a function expansion board or a function expansion unit which is provided to a computer.

The above program means program code (execution program, intermediate code program, or source program) of software realizing the process steps. This program may be used singly or in combination with other program (e.g. OS). Further, this program may be the one that is read from the storage medium, temporarily stored in memory (e.g. RAM) of the device, and read from the memory for its execution.

Further, a storage medium to store the program may be easily segmentationd from the information processing device or fixed (installed) into the information processing device. The storage medium may be connected, as an external storage device, to the information processing device.

As such a storage medium, examples of a storage medium applicable are: magnetic tape, such as video tape or cassette tape; magnetic disc, such as a floppy® disk or hard disk; an optical disk (magnetooptic disk), such as CD-ROM, MO, DVD, or CD-R; memory card, such as IC card or optical card; semiconductor memory, such as mask ROM, EPROM (Erasable Programmable Read Only Memory), EEPROM (Electrically Erasable Programmable Read Only Memory), or a flash ROM.

In addition, a storage medium connected to the information processing device via a network (e.g. Intranet or Internet) may be used. In this case, the information processing device acquires the program by downloading it over the network. That is, the foregoing program may be acquired through a transmission medium (medium holding a program in a flowing manner) such as a network (one connected whether wired or wireless). Note that, a download program is preferably stored in advance in the device (or in a transmitting-end device/receiving-end device).

Further, in the present embodiment, it has been described that the present invention relates to an image compression and decompression processes performed by the present copier. However, the compression and decompression processes of the present invention can be applicable to a program of a DSP (Digital Signal Processor), for example.

Further, it can be said that the present invention relates to (i) a color image forming device and a color copying device each of which performs color printing of image information outputted from an electronic video device such as document scanner, facsimile machine, computer, digital camera, or video player, and (ii) compression and decompression processes used in the color image forming device and the color copying device. An object of the present invention is to realize (a) reduction in required memory space and (b) speedup of data transfer rate by making effective use of image data and generating a minimum segmentation information data in the image compression/decompression section.

In the aforementioned Japanese Laid-Open Patent Application No. 2003/162382, image data is stored in image memory under lossy compression that achieves a high data compression ratio because the lossy compression requires smaller amounts of memory space. Data decompressed from lossy-compressed data has distortion from original image data. Therefore, there is a low reliability or faithfulness in image data reproduction. That is, segmentation based on decompressed CMYK data gives a low accuracy in judgment for image segmentation. In order to solve this problem, for realization of high-quality image processing, image segmentation is performed on yet-to-be-lossy-compressed image data, such as RGB data, to generate and store image segmentation data in the image segmentation memory, the image segmentation data is read from the image segmentation memory when lossy-compressed data read from image memory is decompressed, and correction of a characteristic according to a result of the image segmentation is performed on decompressed CMYK data. However, Japanese Laid-Open Patent Application No. 2003/162382 writes image data and segmentation data in memory. This means that the image data includes segmentation data information, and there is no need that the segmentation data is directly written therein. This cause no problem when the segmentation data is of a small size, but causes the problems of consumption of required memory space and delay in data transfer rate when the segmentation data is of a large size.

The present copier of FIG. 2 can also be described as follows: the input processing device (input processing section 6) applies reading corrections (shading correction, gamma correction, filtering, color correction) to each piece of RGB data (each image data of R, G, and B) inputted. The input processing device performs, on the image corresponding to the RGB data, segmentation for judgment of black text edge image, colored text edge image, continuous tone image, screened halftone image, background image, solid image, or others, and then generates a 4-bit segmentation signal indicating a result of the judgment. Then, the input processing device compresses the RGB data and the segmentation signal and transmits the compressed RGB data and segmentation signal to a storage device (data storage section 8). The output processing device (output processing section 7) decompresses the compressed RGB data and segmentation signal, applies output corrections (filtering, gamma correction, RGB-to-CMYK conversion, and halftoning such as dithering and error diffusion) and transmits CMYK image data to an output interface (e.g. engine part of a copier).

As illustrated in FIG. 1, in the input processing device, inputted image data is lossy-compressed (JPEG-compressed) by the image compressing section 21 into compression image data, and the image compressing section 21 then transmits the compression image data to a storage device. Further, image data lossy-compressed by the image compressing section 21 is decompressed by the image decompressing section 22 and segmented by the second segmentation section 23. This produces the decompression segmentation signal. Meanwhile, inputted segmentation signal is lossless-compressed by the signal compressing section (first signal compressing section 24) into the compression segmentation signal. Further, the segmentation differential extracting section (differential extracting section 25) compares between the segmentation signal and the decompression segmentation signal, extracts a differential therebetween, and produces the segmentation differential signal (differential signal). Then, the signal compressing section (second signal compressing section 26) performs lossless compression on the segmentation differential signal so as to generate the compression segmentation differential signal. Further, the data size comparing section (size comparing section 27) compares between the compression segmentation signal and the compression segmentation differential signal, and then transmits either of them whichever is of a smaller data size, to the storage device. The foregoing input processing device has an operational effect of reducing data volume of the segmentation signal information, resulting from extraction of the segmentation differential signal, and an object thereof is accordingly to realize (a) reduction in required memory space and (b) speedup of a transfer rate in the data bus.

Figure 4:
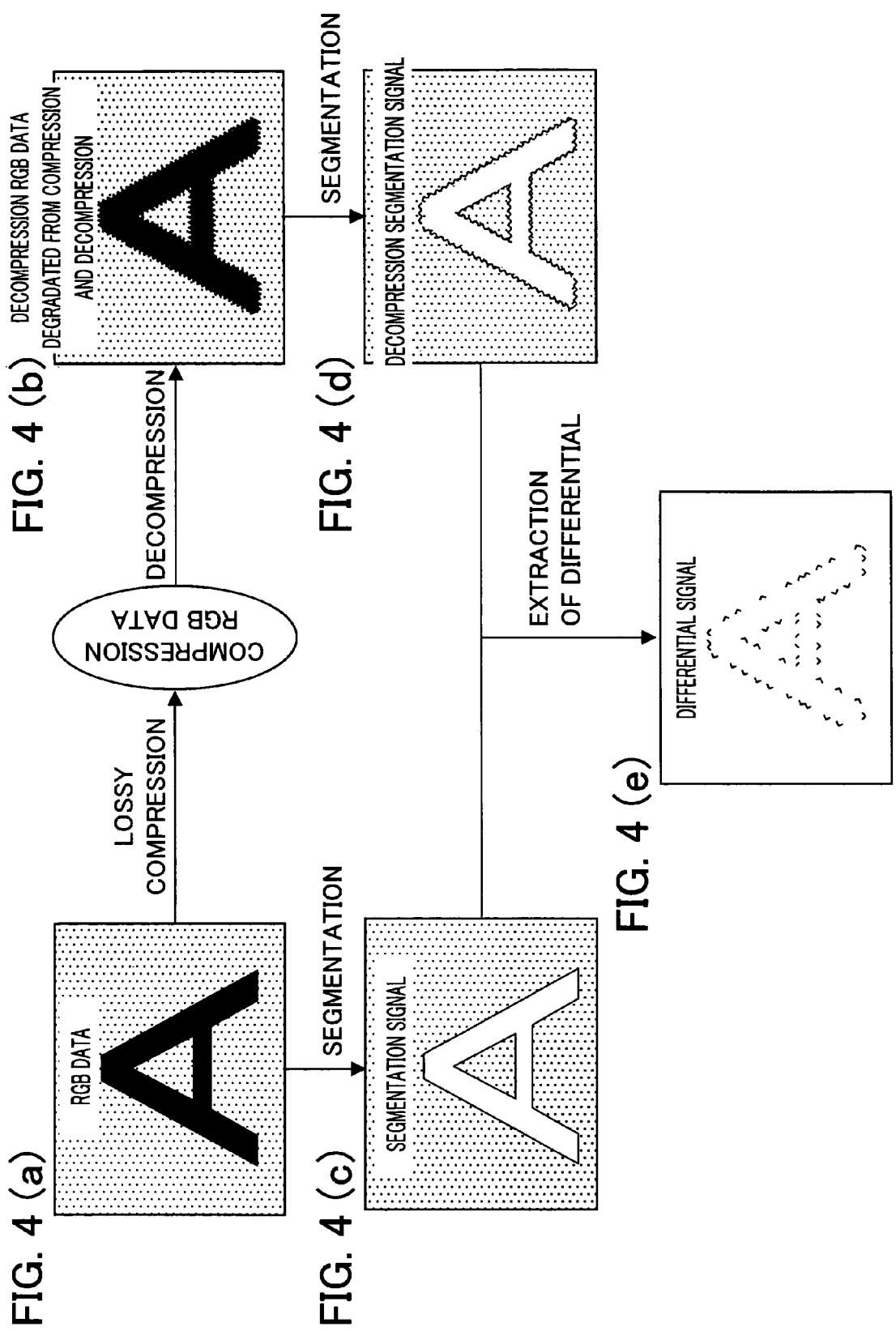
FIG. 4(a) is an explanatory diagram illustrating RGB data outputted from a color correction section to a data compressing section in the image processing section illustrated in FIG. 3.
FIG. 4(b) is an explanatory diagram illustrating decompression RGB data obtained in such a manner that the RGB data of FIG. 4(a) is lossy-compressed by an image compressing section of a data compressing section, and then decompressed by an image decompressing section.
FIG. 4(c) is an explanatory diagram illustrating an image corresponding to a segmentation signal obtained by segmentation of RGB data outputted from the color correction section.
FIG. 4(d) is an explanatory diagram illustrating an image corresponding to a decompression segmentation signal obtained by segmentation of decompression RGB data.
FIG. 4(e) is an explanatory diagram illustrating an image corresponding to a differential signal indicating a differential between a segmentation signal and a decompression segmentation signal.

Further, FIG. 4 is an image diagram of the segmentation differential signal. FIG. 4(*a*) represents an inputted image, FIG. 4(*b*) illustrates image data obtained in such a manner that the inputted image is lossy-compressed by the image compressing section, and then the lossy-compressed image data is decompressed. FIG. 4(*c*) illustrates the segmentation signal obtained in such a manner that the inputted image is segmented by the first signal compressing section 24. FIG. 4(*d*) illustrates the decompression segmentation signal obtained in such a manner that the input image is lossy-compressed by the image compressing section 21 into the compression image data, and the compression image data is subjected to decompression and then segmented by the second segmentation section 23. FIG. 4(*e*) illustrates the segmentation differential signal that indicates a differential between the segmentation signal and the decompression segmentation signal. As is apparent from FIG. 4(*e*), extraction of a differential from the segmentation signal results in extremely reduced data volume of the differential signal, as compared with data volume of the segmentation signal.

In the output processing device, the compression image data is decompressed by the image decompressing section 51 into image data. The signal judging section 52 judges whether the inputted signal is the compression segmentation signal or the compression segmentation differential signal. If the inputted signal is the compression segmentation signal, the first signal decompressing section 53 decompresses the inputted signal to restore the segmentation signal. If the inputted signal is the compression segmentation differential signal, the second signal decompressing section 54 decompresses the inputted signal to restore the segmentation differential signal. The segmentation section 55 segments the image data and then generates the decompression segmentation signal. A segmentation signal restoring section (signal restoring section 56) restores the segmentation signal from the segmentation differential signal and the decompression segmentation signal. Then, the signal selecting section 57, in synchronization with the signal judging section 52, selects between (i) the segmentation signal derived from the compression segmentation signal and (ii) the segmentation signal derived from the compression segmentation differential signal, so as to transmits the selected segmentation signal to the output interface.

The image compressing section 21 which compresses the image data performs DCT and arithmetic encoding on the image data. Further, the image decompressing section 22 performs arithmetic decoding and inverse DCT on the compression image data. In order to produce the decompression segmentation signal in the image input processing device (input processing section 6), the second segmentation section 23 performs segmentation. This segmentation's objective is segmentation of the image data degraded due to lossy compression of the image data and decompression of the compression image data. Therefore, it can be said that (a) the arithmetic encoding (lossless-compressing) section 32 in the image compressing section 21 and (b) the arithmetic decoding section 33 in the image decompressing section 22 are needless operations. The arrangement of FIG. 6 can offer enhanced speed in the image processing section by omitting arithmetic encoding in the image compressing section and arithmetic decoding in the image decompressing section. Further, an object of the present invention is to apply to not only image compression and decompression device but also a program for a DSP or the like as a methodology. In the above description, given as an example is a case of compression and restoration in one device wherein the compressed image data is written into a storage device, and the compressed data read from the storage device is decompressed for use. This is however not the only possibility. Alternatively, the compressed data is distributed through communications or in the form of storage medium so as to be decompressed by another device.

It can be said that the present invention's point is to compress the segmentation signal into a small-size signal and decompress the compressed signal into its original state. As described in conventional art, the segmentation signal is obtained from an original image rather than from a lossy-compressed and decompressed image, which gives a low accuracy. The obtained segmentation signal is stored with lossy-compressed image data so as to be used in image processing of decompressed image data. As compared with the image data, the segmentation signal has a smaller number of bits per pixel (depending upon the number of segments). However, as compared with the image data that achieves a higher compression ratio under lossy compression, the segmentation signal achieves a lower compression ratio under lossless compression only. This is because the segmentation signal must be returned into its original state. In order to solve the problem, the present invention removes redundancy from the segmentation signal for realization of increase in compression ratio of the segmentation signal even under lossless compression.

The size of the segmentation signal is a result of the number of bits per pixel by the number of pixels. Therefore, all of (i) the segmentation signal obtained from original image, (ii) the segmentation signal obtained from lossy-compressed and decompressed image, and (iii) a differential between (i) and (ii) have the same size. However, the lossy-compressed and decompressed image has distortion from the original image, but is image data very similar to the original image. Therefore, it can be considered that the segmentation signal (i) matches the segmentation signal (ii) in large portions although having a difference, when detected by text edge detection or the like, because of loss of high-frequency components. The differential signal indicating a differential between the segmentation signal (i) and the segmentation signal (ii) has "0" in large portions of pixels. From this, a compression ratio of the differential signal under lossless compression can be expected to increase. Therefore, it is preferable to not only generate the differential signal, but also remove redundant "0" portions by lossless compression or the like. Apart from an usually used compression technique, the following technique, for example, can be also considered that an image is divided into blocks each of which are given a number and all "0" blocks are omitted. The present invention may be realized not only by hardware such as an ASIC-based image compression and decompression device but also by software such as an image compression and decompression program incorporated into a DSP for its execution.

Further, the present invention can be expressed as the following first through sixth image processing devices, first image processing device, first and second image processing methods, and a first program. That is, the first image processing device is arranged so as to include: (i) image compressing means for performing lossy compression on original image data inputted; (ii) image decompressing means for decompressing lossy-compressed compression image data; (iii) segmentation means for generating a second segmentation signal from the decompressed compression decompression image data; (iv) segmentation signal differential extracting means for extracting a differential between (I) an inputted first segmentation signal corresponding to the original image data and (II) the second segmentation signal and then outputting a segmentation differential signal; and (v) signal compressing means for performing lossless compression on the segmentation differential signal to output a compression segmentation differential signal.

The second image processing device is arranged so as to include: (i) image decompressing means for decompressing compression image data inputted; (ii) segmentation means for generating a second segmentation signal from decompressed compression decompression image data; (iii) signal decompressing means for decompressing compression segmentation differential signal inputted to output a segmentation differential signal; and (iv) segmentation signal restoring means for restoring the first segmentation signal from the second segmentation signal and the segmentation differential signal.

According to the first and second image processing devices, image data obtained by lossy compression of the inputted image data includes segmentation signal information. With the use of this, a differential data, which is a required minimum data, of the segmentation signals must be written into a storage device. This allows for reduction in required memory space. Further, the segmentation signal information is small in size, so that speedup of data transfer rate is possible. In the data decompressing section, it is possible to completely restore the segmentation signal of the inputted image data on the basis of (a) the segmentation signal derived from image data obtained by decompression of lossy compression data and (b) the segmentation differential signal.

The third image processing device is arranged in the first image processing device so as to further include: (vi) segmentation signal compressing means for performing lossless compression on the first segmentation signal inputted to output a compression segmentation signal; and (vii) data size comparing means for comparing in data size between the compression segmentation signal and the compression segmentation differential signal to output either of the signals, whichever is of a smaller size.

The fourth image processing device is arranged in the image processing device so as to further include signal judging means for judging whether inputted signal is the compression segmentation signal or the compression segmentation differential signal; segmentation signal decompressing means for decompressing the compression segmentation signal to output the first segmentation signal; and signal selecting means for selecting and outputting either the first segmentation signal restored in synchronization with the signal judging means or the decompressed first segmentation signal.

According to the third and fourth image processing devices, by comparing between the compression segmentation signal and the compression segmentation differential signal, it is possible to select either of them, whichever requires a smaller memory space. Accordingly, it is possible to reduce a required memory space. Further, the segmentation signal information is small in size, so that speedup of a data transfer rate is possible. In the output processing device, the signal judgment, which is judgment whether the inputted signal is the compression segmentation signal or the compression segmentation differential signal, enables processing of the inputted signal only, which allows for speedup of a process in the image decompressing section.

The fifth image processing device is arranged in the first image processing device, in such a manner that the image compressing means and the image decompressing means performs JPEG encoding by using a DCT scheme, wherein the image compressing means outputs a signal before subjected to entropy encoding to the image decompressing means, and the image decompressing means performs processing, omitting the entropy decoding. With this arrangement, the segmentation in the segmentation section aims to segment image data degraded due to lossy compression of the image data and decompression of the compression image data. Therefore, (a) the arithmetic encoding (lossless-compressing) section in the image compressing section and (b) the arithmetic decoding section in the image decompressing section are needless operations. Omission of the needless operations allows for reduction in processing time in the image compressing section and the image decompressing section of the input processing device.

The sixth image processing device is arranged so as to incorporate the first image processing device and the second image processing device into one unit so that one image decompressing means and one segmentation means are used. This arrangement can reduce a circuit size unless compression and decompression are performed concurrently. The first image processing device is an image processing device including the first, second, or sixth image processing device.

The seventh image processing device is arranged so as to have (a) a compressing section including: (i) image compressing means for performing lossy compression on original image data inputted; (ii) image decompressing means for decompressing lossy-compressed compression image data; (iii) segmentation means for generating a second segmentation signal from the decompressed compression decompression image data; (iv) segmentation signal differential extracting means for extracting a differential between (I) an inputted first segmentation signal corresponding to the original image data and (II) the second segmentation signal and then outputting a segmentation differential signal; and (v) signal compressing means for performing lossless compression on the segmentation differential signal to output a compression segmentation differential signal; and (b) a restoring section including: (i) image decompressing means for decompressing compression image data inputted; (ii) segmentation means for generating a second segmentation signal from decompressed compression decompression image data; (iii) signal decompressing means for decompressing the compression segmentation differential signal inputted to output a segmentation differential signal; and (iv) segmentation signal restoring means for restoring the first segmentation signal from the second segmentation signal and the segmentation differential signal.

The first image processing method is a method having: (i) a step of performing lossy compression on original image data inputted; (ii) a step of decompressing lossy-compressed compression image data; (iii) a step of generating a second segmentation signal from the decompressed compression decompression image data; (iv) a step of extracting a differential between (I) an inputted first segmentation signal corresponding to the original image data and (II) the second segmentation signal and then outputting a segmentation differential signal; and (v) a step of performing lossless compression on the segmentation differential signal to output a compression segmentation differential signal. The second image processing method is a method having: (i) a step of decompressing compression image data inputted; (ii) a step of generating a second segmentation signal from decompressed compression decompression image data; (iii) a step of decompressing compression segmentation differential signal inputted to output a segmentation differential signal; and (iv) a step of restoring the first segmentation signal from the second segmentation signal and the segmentation differential signal. The first program is a program causing a processor to execute the first or second image processing method.

Note that, the image forming device (present copier) of the foregoing embodiment performs both compression and decompression. This is not the only possibility. Alternatively, in the case where image data is communicated via a network or a circuit, it can be considered that a transmitting end performs compression only, whereas a receiving end performs decompression only. Therefore, compression and decompression can be performed in separate devices. Accordingly, even if the first image processing device is used alone, it is possible to obtain the effect of producing a lower data volume without reducing the amount of information of lossy-compressed image data and lossless-compressed segmentation data.

As described above, an image compression device (present compression device) is an image compression device which performs lossy compression on original image data, including: (i) a first segmentation section for performing segmentation on the original image data and then generating a segmentation signal indicating a result of the segmentation; (ii) an image compressing section for performing lossy compression on the original image data to generate compression image data; (iii) a first image decompressing section for decompressing the compression image data to generate decompression image data; (iv) a second segmentation section for performing segmentation on the decompression image data and then generating a decompression segmentation signal indicating a result of the segmentation; (v) a differential extracting section for extracting a differential between the segmentation signal and the decompression segmentation signal, and then generating a differential signal indicating a result of the extraction; and (vi) a differential signal compressing section for performing lossless compression on the differential signal to generate a compression differential signal.

The present compression device is an image compression device that can be provided in an image output device (device that outputs image data to an external entity) such as a scanner. In addition, the present compression device includes the image compressing section for performing lossy compression on the original image data to generate compression image data, and has a function of outputting this compression image data to an external entity (storage device (memory), storage medium, communications circuit, printer, or others).

The original image data herein is (a) a document image obtained by reading (scanning) of an image provided on a sheet-type document or (b) an electronic image such as computer graphics. The compression image data is data obtained by lossy compression of the original image data for decrease in size of the original image data. The lossy compression is a compression technique that does not decompress compressed image data 100% back to its original image data.

Especially, the present compression device is designed so as to generate and output, in addition to the compression image data, segmentation information corresponding to a result of segmentation of the original image data. To obtain the segmentation information, the present compression device includes: the first segmentation section, the first image decompressing section, the second segmentation section, the differential extracting section, and the differential signal compressing section.

That is, in the present compression device, the first segmentation section performs segmentation on the original image data and then generates a segmentation signal indicating a result of the segmentation. Next, the first image decompressing section decompresses the compression image data obtained by lossy compression and then generates the decompression image data.

Then, on this decompression image data, the second segmentation section performs segmentation and then generates a decompression segmentation signal indicating a result of the segmentation. Further, the differential extracting section extracts a differential between the segmentation signal and the decompression segmentation signal and then generates a differential signal indicating a result of the extraction. Thereafter, the differential signal compressing section performs lossless-compression on the generated differential signal so as to output the compression differential signal as segmentation information to an external entity.

This compression differential signal is generated by lossless compression and is therefore possible to be completely decompressed in the form of the differential signal. The differential signal is calculated with a decompression segmentation signal that is a result of the segmentation to the decompression image data (image data obtained by decompression of the compression image data), thereby generating a usual segmentation signal (signal obtained by segmentation of the image data before it is compressed).

Here, the decompression image data usually has distortion from the original image data, but is an image data very similar to the original image data. Therefore, the decompression segmentation signal matches the usual segmentation signal in large portions although having a difference from the segmentation signal, when detected by text edge detection or the like, because of loss of high-frequency components.

Therefore, the differential signal is a signal including "0 (blank)" in large portions. Therefore, "0" portions can be easily removed from the differential signal to generate the compression differential signal obtained by lossless compression of the differential signal. This extremely increases a compression ratio (For example, it is possible to divide the differential signal into blocks each of which is given a number, and then omit all "0" blocks for compression.). Therefore, the present compression device makes it possible to extremely reduce size of the compression differential signal.

Thus, the present compression device outputs, as segmentation information, the compression differential signal with a small size as well as the compression image data to an external entity. Therefore, the present compression device can decrease the size of segmentation information to be outputted, as compared with an arrangement where a segmentation signal and a compressed segmentation signal as well as the compression image data are outputted. Accordingly, the present compression device can reduce a time taken for data output (transfer). Moreover, it is possible to reduce a required storage space in storing the generated compression image data and others in the storage section.

Note that, as described above, the differential signal (and compression differential signal) is usually a signal smaller in size than the segmentation signal and the compressed segmentation signal. However, it can be considered that depending upon a state of the original image data and a compression and decompression scheme, the compression differential signal becomes larger in size than the segmentation signal.

Therefore, in order to address such a problem, the present compression device preferably includes, in addition to the differential signal compressing section, the segmentation signal compressing section and the size comparing section. Here, the segmentation signal compressing section generates a compression segmentation signal (compressed segmentation signal) by lossless-compressing a segmentation signal. The lossless compression is a compression technique that decompresses compressed data 100% back to its original data.

Further, the size comparing section selects, as the segmentation information (information for use in image decompression), either the compression segmentation signal or the compression differential signal, whichever is of a smaller size.

This allows the present compression device to output the segmentation signal as the segmentation information when the compression differential signal becomes larger in size than the compression segmentation signal.

Further, the image compressing section of the present compression device can be arranged so as to perform, on the original image data, conversion into sets of frequencies and entropy encoding so as to generate the compression image data. In this arrangement, the first image decompressing section performs, on the compression image data, entropy decoding and inverse conversion from sets of frequencies so as to generate decompression compression image data.

Note that, as described above, the image decompression performed by the first image decompressing section is a process to cause the second segmentation section to generate the decompression segmentation signal. That is, this process is performed so that the second segmentation section performs segmentation on the decompression image data (image-degraded image data obtained in such a manner that the original image data is decompressed after it was lossy-compressed) obtained by the first image decompressing section so as to generate the decompression segmentation signal.

Therefore, it can be said that the original image data outputted to the first image decompressing section does not necessarily require to be subjected to entropy encoding (lossless compression) as far as the original image data is subjected to conversion into sets of frequencies (lossy compression).

On this account, in this case, the image compressing section is preferably designed so as to output, to the first image decompressing section, the compression image data obtained by only conversion into sets of frequencies. Such an arrangement eliminates the need for entropy decoding by the first image decompressing section, so that it is possible to simplify a circuit configuration of the first image decompressing section. Accordingly, it is possible to reduce cost for the first image decompressing section. In addition, it is possible to reduce a time for decompression by the first image decompressing section.

Note that, examples of a technique for the above conversion into sets of frequencies includes DCT transformation and wavelet compression (DWT). Further, examples of a technique for entropy encoding includes arithmetic encoding and Huffman coding.

Further, a first image decompression device (first decompression device) of the present invention is an image decompression device which generates decompression image data and a segmentation signal in accordance with compression image data and a compression differential signal, generated by the present compression device, the image decompression device comprising: (i) a second image decompressing section for decompressing the compression image data to generate the decompression image data; (ii) a third segmentation section for performing segmentation on the decompression image data and then generating a decompression segmentation signal indicating a result of the segmentation; (iii) a differential signal decompressing section for decompressing the compression differential signal to generate a differential signal; and (iv) a signal restoring section for generating the segmentation signal from the decompression segmentation signal and the differential signal.

The first decompression device generates, in accordance with the compression image data and compression differential signal generated by the foregoing present compression device, the decompression image data and the segmentation signal (signal obtained by segmentation of the original image data), and then outputs the generated decompression image data and segmentation signal to an external entity (printer main body, storage device, storage medium, communications circuit, or others).

In order to generate the decompression image data and the segmentation signal in accordance with the compression image data and the compression differential signal, the first decompression device includes the second image decompressing section, the third segmentation section, the differential signal decompressing section, and the signal restoring section.

That is, in the first decompression device, the second image decompressing section decompresses the compression image data to generate the decompression image data. Further, on this decompression image data, the third segmentation section performs segmentation and generates the decompression segmentation signal indicating a result of the segmentation. Subsequently, the differential signal decompressing section decompresses the compression differential signal to generate the differential signal. Then, in accordance with these decompression segmentation signal and differential signal, the signal restoring section generates the segmentation signal.

Thus, the first decompression device is arranged so as to easily generate, from the compression image data and the compression differential signal, a complete segmentation signal corresponding to the original image data.

Further, a second image decompression device (second decompression device) of the present invention is an image decompression device which generates decompression image data and a segmentation signal in accordance with compression image data and segmentation information, generated by the present compression device, the image decompression device comprising: (a) a second image decompressing section for decompressing the compression image data to generate the decompression image data; (b) a third segmentation section for performing segmentation on the decompression image data and then generating a decompression segmentation signal indicating a result of the segmentation; (c) a signal judging section for judging whether the segmentation information is a compression segmentation signal or a compression differential signal; (d) a differential signal decompressing section for decompressing the compression differential signal to generate a differential signal; (e) a signal restoring section for generating the segmentation signal from the decompression segmentation signal and the differential signal; and (f) a segmentation signal decompressing section for decompressing the compression segmentation signal to generate the segmentation signal.

This second decompression device is an image decompression device corresponding to the present compression device arranged so as to include the differential signal compressing section, the segmentation signal compressing section, and the size comparing section. Therefore, as with the first decompression device, this second decompression device is arranged so as to further include the signal judging section and the segmentation signal decompressing section, in addition to the second image decompressing section, the third segmentation section, the differential signal decompressing section, and the signal restoring section.

That is, in the second decompression device, the second image decompressing section decompresses the compression image data to generate the decompression image data. On this decompression image data, the third segmentation section performs segmentation and then generates the decompression segmentation signal indicating a result of the segmentation.

Further, the signal judging section judges whether the inputted segmentation information is a compression segmentation signal or a compression differential signal. If this signal is the compression differential signal, the differential signal decompressing section decompresses the compression differential signal to generate a differential signal. Thereafter, the signal restoring section generates the segmentation signal in accordance with the decompression segmentation signal and the differential signal. On the other hand, if the above information is the compression segmentation signal, the segmentation signal decompressing section decompresses this compression segmentation signal so as to generate the segmentation signal.

Thus, the second decompression device is arranged so as to easily generate, from the compression image data and the segmentation information (compression segmentation signal or compression differential signal), a complete segmentation signal corresponding to the original image data.

The foregoing first decompression device and the second decompression device can be provided in a printer for printing images. This printer is capable of excellent print of an image corresponding to the original image data in accordance with the compression image data and the differential signal (or segmentation information) transmitted from the present compression device (or the image output device including the present compression device).

Moreover, one image processing device may be arranged by using the present compression device and the first decompression device (or the second decompression device). In this arrangement, it is preferable that the image processing device is further provided with a storage device for storing the compression image data and compression differential signal (or segmentation information) obtained by the present compression device. Such an image processing device can be provided in a copier including a scanner and a printer, for example.

For constitution of one image processing device with the present compression device and the first or second decompression device (hereinafter simply referred to as image decompression device), it is preferable to integrate the present compression device and the image decompression device into one unit, and to function the first image decompressing section of the present compression device as the second image decompressing section of the image decompression device. In such an image processing device, the present compression device and the image decompression device do not operate concurrently. Therefore, in the above arrangement, the second image decompressing section can be omitted. Accordingly, a circuit configuration of the image processing device can be simplified.

Similarly, the second segmentation section of the present compression device may be functioned as the third segmentation section of the image decompression device. In this arrangement, the image decompression device does not need to be provide with the third segmentation section, so that a circuit configuration of the image processing device can be simplified.

Further, an image compression method of the present invention (present compression method) is an image compression method of performing lossy compression on original image data, comprising: a first segmentation step of performing segmentation on the original image data and then generating a segmentation signal indicating a result of the segmentation; an image compressing step of performing lossy compression on the original image data to generate compression image data; a first image decompressing step of decompressing the compression image data to generate decompression image data; a second segmentation step of performing segmentation on the decompression image data and then generating a decompression segmentation signal indicating a result of the segmentation; a differential extracting step of extracting a differential between the segmentation signal and the decompression segmentation signal, and then generating a differential signal indicating a result of the extraction; and a differential signal compressing step of performing lossless compression on the differential signal to generate a compression differential signal.

The present compression method is a compression method used in the foregoing present compression device. Therefore, by using the present compression method, it is possible to output a small-size compression differential signal as the segmentation information, as well as the compression image data.

Therefore, the present compression method can decrease the size of the segmentation information to be outputted, as compared with an arrangement where the segmentation signal and a compressed segmentation signal as well as the compression image data are outputted. Accordingly, the present compression device can reduce a time taken for data output (transfer). Moreover, it is possible to reduce a required storage space in storing the generated compression image data and others in the storage section.

Further, an image decompression method of the present invention (present decompression method) is an image decompression method of generating decompression image data and a segmentation signal in accordance with compression image data and a compression differential signal, generated in the foregoing present compression method, the image decompression method comprising: a second image decompressing step of decompressing the compression image data to generate the decompression image data; a third segmentation step of performing segmentation on the decompression image data and then generating a decompression segmentation signal indicating a result of the segmentation; a differential signal decompressing step of decompressing the compression differential signal to generate a differential signal; and a signal restoring step of generating the segmentation signal from the decompression segmentation signal and the differential signal.

The present decompression method is a method used in the foregoing first decompression device. Therefore, by using the present decompression method, it is possible to easily generate a complete segmentation signal corresponding to the original image data on the basis of the compression image data and compression differential signal obtained by the present compression method and the present compression device.

Further, an image processing program of the present invention is a program causing a computer to execute the steps of the present compression method (first segmentation step, image compressing step, first image decompressing step, second segmentation step, and differential extracting step) or the steps of the present decompression method (second image decompressing step, third segmentation step, and signal restoring step).

By loading this program into a computer, it is possible to cause that computer to perform the steps of the present compression method or the present decompression method.

By storing this program into a computer-readable storage medium, it is possible to easily store and distribute the program.

Specific embodiments or examples implemented in the description of the embodiments only show technical features of the present invention and are not intended to limit the scope of the invention. Variations can be effected within the spirit of the present invention and the scope of the following claims.

What is claimed is:

1. An image compression device which performs lossy compression on original image data, comprising:
  (i) a first segmentation section for performing segmentation on the original image data and then generating a segmentation signal indicating a result of the segmentation;
  (ii) an image compressing section for performing lossy compression on the original image data to generate compression image data;
  (iii) a first image decompressing section for decompressing the compression image data to generate decompression image data;
  (iv) a second segmentation section for performing segmentation on the decompression image data and then generating a decompression segmentation signal indicating a result of the segmentation;
  (v) a differential extracting section for extracting a differential between the segmentation signal and the decompression segmentation signal, and then generating a differential signal indicating a result of the extraction; and
  (vi) a differential signal compressing section for performing lossless compression on the differential signal to generate a compression differential signal.

2. The image compression device according to claim 1, further comprising:
  (vii) a segmentation signal compressing section for performing lossless compression on the segmentation signal to generate a compression segmentation signal; and
  (viii) a size comparing section for selecting, as segmentation information, either the compression segmentation signal or the compression differential signal, whichever is of a smaller size.

3. The image compression device according to claim 1, wherein:
  the image compressing section performs, on the original image data, lossy compression by conversion into sets of frequencies and entropy encoding so as to generate the compression image data.

4. The image compression device according to claim 3, wherein:
  the image compressing section outputs, to the first image decompressing section, the compression image data obtained by only the conversion into sets of frequencies.

5. The image compression device according to claim 3, wherein:
  the image compressing section performs, on the original image data, (a) DCT transformation as the conversion into sets of frequencies and (b) arithmetic encoding as the entropy encoding.

6. An image output device including an image compression device which performs iossy compression on original image data, the image compression device comprising:
  (i) a first segmentation section for performing segmentation on original image data and then generating a segmentation signal indicating a result of the segmentation;
  (ii) an image compressing section for performing lossy compression on original image data to generate compression image data;
  (iii) a first image decompressing section for decompressing the compression image data to generate decompression image data;
  (iv) a second segmentation section for performing segmentation on the decompression image data and then generating a decompression segmentation signal indicating a result of the segmentation;
  (v) a differential extracting section for extracting a differential between the segmentation signal and the decompression segmentation signal, and then generating a differential signal indicating a result of the extraction; and
  (vi) a differential signal compressing section for performing lossless compression on the differential signal to generate a compression differential signal.

7. An image decompression device which generates decompression image data and a segmentation signal in accordance with compression image data and a compression differential signal, the image decompression device comprising:
  (i) a second image decompressing section for decompressing the compression image data to generate the decompression image data;
  (ii) a third segmentation section for performing segmentation on the decompression image data and then generating a decompression segmentation signal indicating a result of the segmentation;
  (iii) a differential signal decompressing section for decompressing the compression differential signal to generate a differential signal; and
  (iv) a signal restoring section for generating the segmentation signal from the decompression segmentation signal and the differential signal.

8. An image decompression device which generates decompression image data and a segmentation signal in accordance with compression image data and segmentation information,
  the image decompression device comprising:
  (a) a second image decompressing section for decompressing the compression image data to generate the decompression image data;
  (b) a third segmentation section for performing segmentation on the decompression image data and then generating a decompression segmentation signal indicating a result of the segmentation;
  (c) a signal judging section for judging whether the segmentation information is a compression segmentation signal or a compression differential signal;
  (d) a differential signal decompressing section for decompressing the compression differential signal to generate a differential signal;
  (e) a signal restoring section for generating the segmentation signal from the decompression segmentation signal and the differential signal; and (f) a segmentation signal decompressing section for decompressing the compression segmentation signal to generate the segmentation signal.

9. A printer including an image decompression device which generates decompression image data and a segmentation signal in accordance with compression image data and a compression differential signal, the image decompression device comprising:
- (i) a second image decompressing section for decompressing the compression image data to generate the decompression image data;
- (ii) a third segmentation section for performing segmentation on the decompression image data and then generating a decompression segmentation signal indicating a result of the segmentation;
- (iii) a differential signal decompressing section for decompressing the compression differential signal to generate a differential signal; and
- (iv) a signal restoring section for generating the segmentation signal from the decompression segmentation signal and the differential signal.

10. A printer including an image decompression device which generates decompression image data and a segmentation signal in accordance with compression image data and segmentation information, the image decompression device comprising:
- (a) a second image decompressing section for decompressing the compression image data to generate the decompression image data;
- (b) a third segmentation section for performing segmentation on the decompression image data and then generating a decompression segmentation signal indicating a result of the segmentation;
- (c) a signal judging section for judging whether the segmentation information is a compression segmentation signal or a compression differential signal;
- (d) a differential signal decompressing section for decompressing the compression differential signal to generate a differential signal;
- (e) a signal restoring section for generating the segmentation signal from the decompression segmentation signal and the differential signal; and
- (f) a segmentation signal decompressing section for decompressing the compression segmentation signal to generate the segmentation signal.

11. An image processing device comprising:
- (a) an image compression device comprising:
- (i) a first segmentation section for performing segmentation on original image data and then generating a segmentation signal indicating a result of the segmentation;
- (ii) an image compressing section for performing lossy compression on the original image data to generate compression image data;
- (iii) a first image decompressing section for decompressing the compression image data to generate decompression image data;
- (iv) a second segmentation section for performing segmentation on the decompression image data and then generating a decompression segmentation signal indicating a result of the segmentation;
- (v) a differential extracting section for extracting a differential between the segmentation signal and the decompression segmentation signal, and then generating a differential signal indicating a result of the extraction; and
- (vi) a differential signal compressing section for performing lossless compression on the differential signal to generate a compression differential signal; and
- (b) an image decompression device comprising:
- (i) a second image decompressing section for decompressing the compression image data to generate the decompression image data;
- (ii) a third segmentation section for performing segmentation on the decompression image data and then generating a decompression segmentation signal indicating a result of the segmentation;
- (iii) a differential signal decompressing section for decompressing the compression differential signal to generate a differential signal; and
- (iv) a signal restoring section for generating the segmentation signal from the decompression segmentation signal and the differential signal.

12. The image processing device according to claim 11, wherein:
the first image decompressing section of the image compression device functions as the second image decompressing section of the image decompression device.

13. The image processing device according to claim 11, wherein:
the second segmentation section of the image compression device functions as the third segmentation section of the image decompression device.

14. A copier including an image processing device comprising:
- (a) an image compression device comprising:
- (i) a first segmentation section for performing segmentation on original image data and then generating a segmentation signal indicating a result of the segmentation;
- (ii) an image compressing section for performing lossy compression on the original image data to generate compression image data;
- (iii) a first image decompressing section for decompressing the compression image data to generate decompression image data;
- (iv) a second segmentation section for performing segmentation on the decompression image data and then generating a decompression segmentation signal indicating a result of the segmentation;
- (v) a differential extracting section for extracting a differential between the segmentation signal and the decompression segmentation signal, and then generating a differential signal indicating a result of the extraction; and
- (vi) a differential signal compressing section for performing lossless compression on the differential signal to generate a compression differential signal; and
- (b) an image decompression device comprising:
- (i) a second image decompressing section for decompressing the compression image data to generate the decompression image data;
- (ii) a third segmentation section for performing segmentation on the decompression image data and then generating a decompression segmentation signal indicating a result of the segmentation;
- (iii) a differential signal decompressing section for decompressing the compression differential signal to generate a differential signal; and
- (iv) a signal restoring section for generating the segmentation signal from the decompression segmentation signal and the differential signal.

15. An image compression method of performing lossy compression on original image data by using a processor, comprising:
a first segmentation step of performing segmentation on the original image data and then generating a segmentation signal indicating a result of the segmentation;
an image compressing step of performing lossy compression on the original image data to generate compression image data, by using the processor;
a first image decompressing step of decompressing the compression image data to generate decompression image data;
a second segmentation step of performing segmentation on the decompression image data and then generating a decompression segmentation signal indicating a result of the segmentation;

a differential extracting step of extracting a differential between the segmentation signal and the decompression segmentation signal, and then generating a differential signal indicating a result of the extraction; and a differential signal compressing step of performing lossless compression on the differential signal to generate a compression differential signal.

16. An image decompression method of generating decompression image data and a segmentation signal in accordance with compression image data and a compression differential signal by using a processor, the image decompression method comprising:

a second image decompressing step of decompressing the compression image data to generate the decompression image data by using the processor;

a third segmentation step of performing segmentation on the decompression image data and then generating a decompression segmentation signal indicating a result of the segmentation;

a differential signal decompressing step of decompressing the compression differential signal to generate a differential signal; and a signal restoring step of generating the segmentation signal from the decompression segmentation signal and the differential signal.

17. A computer-readable medium having instructions stored thereon, such that when the instructions are read and executed by a processor, the processor is configured to perform the steps of:

a first segmentation step of performing segmentation on original image data and then generating a segmentation signal indicating a result of the segmentation;

an image compressing step of performing lossy compression on the original image data to generate compression image data;

a first image decompressing step of decompressing the compression image data to generate decompression image data;

a second segmentation step of performing segmentation on the decompression image data and then generating a decompression segmentation signal indicating a result of the segmentation;

a differential extracting step of extracting a differential between the segmentation signal and the decompression segmentation signal, and then generating a differential signal indicating a result of the extraction; and a differential signal compressing step of performing lossless compression on the differential signal to generate a compression differential signal.

18. A computer-readable medium having instructions stored thereon, such that when the instructions are read and executed by a processor, the processor is configured to perform the steps of:

a second image decompressing step of decompressing the compression image data to generate decompression image data;

a third segmentation step of performing segmentation on the decompression image data and then generating a decompression segmentation signal indicating a result of the segmentation;

a differential signal decompressing step of decompressing a compression differential signal to generate a differential signal; and a signal restoring step of generating a segmentation signal from the decompression segmentation signal and the differential signal.

* * * * *